Patented Sept. 21, 1943

2,329,741

UNITED STATES PATENT OFFICE 2,329,741

CELLULOSE ETHER DERIVATIVES AND PROCESS FOR PRODUCING THE SAME

Aubrey E. Broderick, South Charleston, W. Va., assignor to Carbide and Carbon Chemicals Corporation, a corporation of New York No Drawing. Application October 19, 1940, Serial No. 361,902

23 Claims. (Cl. 260—231)

The present invention relates to the production of a new class of ether derivatives of carbohydrates, and more especially it concerns certain modified ether derivatives of the higher polyoses having especial utility as coating and impregnating compositions and as adhesives, and for the manufacture of water- and oil-resistant films, filaments and other shaped articles. The invention includes a novel process for producing these products from ether derivatives of the higher polyoses, and particularly from water-soluble cellulose ethers which, while well known, have heretofore been of restricted utility in industry because of such water-solubility, which rendered them unsuitable for most uses to which cellulose ethers and esters are placed, except in so far as the property of water-solubility is desirable.

According to a preferred form of the invention, a water-soluble cellulose ether containing at least some free hydroxyl groups per macromolecule, such as a water-soluble hydroxyalkyl cellulose— or a partially alkylated cellulose, such as a water-soluble methyl or ethyl cellulose—is dissolved in an aqueous liquid, convenienty at room temperature, with agitation where necessary. A water-soluble aldehyde having the structure designated by the formula

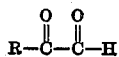

wherein R represents either hydrogen or an alkyl group—such as glyoxal, or pyruvic aldehyde, or a mixture of such aldehydes—then is dissolved in the aqueous solution in any simple manner. After complete solution is effected, the resultant liquid composition is employed to form, coat or impregnate an article, and then is heated or otherwise treated to eliminate the water and facilitate a reaction between the cellulose ether and the aldehyde—thereby forming a water-insoluble film, filament or other shaped mass of the cellulose ether derivative—or coating or impregnating such article with that derivative. Films or other articles thus formed are substantially completely insoluble in cold water and in the common organic solvents—for example, the ketones such as acetone and methyl ethyl ketone; the lower monohydric aliphatic alcohols such as methanol, ethanol and butanol; hydrocarbons such as toluene and petroleum ether; the lower fatty acids such as acetic acid; ethers such as "Methyl Cellosolve"; and the usual fatty oils. Such films also are resistant to dilute aqueous solutions of caustic soda. Thus, films formed from these new products may be used for wrapping articles which require protection from moisture but which are made from substances chemically reactive with or capable of attacking the usual types of protective wrapping materials.

Among water-soluble ethers of cellulose useful in the process may be mentioned those water-soluble hydroxyalkyl celluloses prepared by the method disclosed by A. W. Schorger on page 8, and in Example IV on page 11, of United States Patent No. 1,941,278. Likewise water-soluble partially alkylated celluloses, such as a medium viscosity water-soluble methyl cellulose, are effectively used in the process. Such ethers evidently contain from one to two methyl groups for each glucose anhydride unit.

It is preferred to use in the process dialyzed aqueous solutions of the cellulose ethers to insure the production of films and filaments free from zones of weakness due to discontinuity therein. However, undialyzed solutions of such ethers may be used, and may provide products suitable for some purposes. While catalysts for the acetal-type condensation reaction, such as mineral acids, may be present in the solution of cellulose ether— (the acetal-type reaction goes to virtual completion as the water is removed)—the use of catalysts is in general objectionable due to practical difficulties encountered in removing the catalysts and their reaction products from the final film, filament, or other shaped article.

There may be present in the aqueous solutions undergoing the reaction small amounts of organic solvents, such as the lower ketones, alcohols, ethers, etc., in which solvents both the water-soluble cellulose ethers and the glyoxal, pyruvic aldehyde or equivalent aldehyde are virtually insoluble. Thus, for example, such aqueous solutions will tolerate small percentages, around 1% to 15%, of acetone, methanol and ethanol, the amount depending upon the concentration of the cellulose ether and aldehyde.

Polyhydric alcohols, such as glycerol, propylene glycol, etc., may be present in the aqueous solution of cellulose ether reacted with the aldehyde, with the production of valuable products, which possibly may include an acetal derivative of such polyhydric alcohol, and the mixed acetal of the cellulose ether and polyhydric alcohol; in conjunction with the acetal derivative of the cellulose ether.

The following examples serve to illustrate the invention.

EXAMPLE 1

*Glyoxal derivative of methyl cellulose*

Five grams of a medium viscosity water-soluble methyl cellulose (a 2% aqueous solution of which has a viscosity of about 50 centipoises at 20° C.) were dissolved in 95 cc. of cold distilled water with agitation. To this solution were added 2.44 grams of glyoxal (containing 18% of water)—equivalent to 2 grams of glyoxal for each 5 grams of the methyl cellulose in the solution. The resultant solution was allowed to stand for 3 days. The tendency for the solution to form a thin gel was prevented by vigorous agitation. A clear glass-like film was formed upon spreading a thin layer of this solution on a glass plate and drying the film. A wide range of drying temperatures has been used—those ranging between around room temperature and 100° C. being particularly suitable. The film was readily removed from the glass by adding water to the plate. The resultant film was somewhat more brittle than a film of the original water-soluble methyl cellulose, and was relatively inextensible, and completely insoluble in cold water and in ketones such as acetone; alcohols such as methanol and butanol; toluene; petroleum ether; acetic acid; and the ethers, such as diethyl ether, and the monomethyl ether of ethylene glycol.

EXAMPLE 2

*Glyoxal derivative of hydroxyethyl cellulose*

A water-soluble hydroxyethyl cellulose was prepared by steeping a sulfite wood pulp in a 19% by weight solution of caustic soda, after which it was shredded and stored at a temperature within the range from 20° to 30° C. for 168 hours. The aged alkali cellulose was reacted for about 8 hours in a baratte with ethylene oxide vapors in amount approximately 75% of the dry weight of the cellulose, at room temperature and under a pressure near but below atmospheric pressure, in the absence of air. The resultant mass was dissolved in water, and the caustic soda was neutralized with acetic acid (other acids may be used). The sodium salts thus formed were removed by dialysis. (Other known methods may be used for isolating and removing the inorganic salts.) A seamless tube of regenerated cellulose was filled with the crude water-soluble hydroxyethyl cellulose, and was bathed in warm running water until the ash content of the crude product was reduced to approximately 1% or less, based on the weight of total solids in the solution.

To 50 grams of a 10% aqueous solution of this dialyzed water-soluble hydroxyethyl cellulose were added 2 grams of glyoxal (containing 18% of moisture). The mixture was stirred at room temperature for 30 minutes to effect solution of the glyoxal. The resultant solution was converted to a film and dried at 105° C., yielding a clear glassy film having good tensile strength, and which was completely insoluble in water and in the common organic solvents mentioned in Example 1.

EXAMPLE 3

*Pyruvic aldehyde derivative of hydroxyethyl cellulose*

To 50 grams of the 10% aqueous solution of dialyzed water-soluble hydroxyethyl cellulose described in Example 2, were added 2 grams of pyruvic aldehyde, and the mixture was stirred at room temperature until complete homogeneity was secured. On removal of water from a thin film of the resultant solution by heating at 105° C., the dried film was clear; somewhat more flexible than the film produced in Example 2; and was no longer soluble in water and in the common organic solvents mentioned in Example 1. The film was slightly less resistant to the absorption of water than that made from the corresponding glyoxal derivative. The water-resistance of the product may be increased by conducting the drying operation within an enclosed space to prevent evaporation of the pyruvic aldehyde—or by increasing the amount of the latter used.

EXAMPLE 4

*Pyruvic aldehyde derivative of methyl cellulose*

Following the general procedure described in Example 1, 5 grams of the water-soluble methyl cellulose recited in that example were reacted with pyruvic aldehyde in amount corresponding to 2 grams of the latter for each 5 grams of methyl cellulose in the aqueous solution thereof. Films made from the resultant product, dried at 105° C., were similar to those secured in Example 1, being insoluble in water and in the common organic solvents mentioned in Example 1, but having somewhat lower moisture resistance than those produced in Example 1.

Fabrics of cellulose and cellulose derivatives, paper, and other fibrous structures impregnated or laminated with glyoxal and pyruvic aldehyde derivatives of water-soluble cellulose ethers also have imparted thereto in high degree a resistance to penetration by oils of mineral, vegetable and animal origin, greases, etc.

The products of the present invention are also well adapted for use in or as wrapping materials for wrapping articles such as stick dynamite to provide a water-proof package. None of the commercially available wrapping materials is suitable for this service, due to the solvent action of the nitroglycerine and probably the nitroglycol, where used, on components of such wrapping materials. The new products are highly resistant to such solvent action.

It will be understood that other water-soluble cellulose ethers, such as water-soluble hydroxypropyl celluloses and ethyl cellulose, may be used effectively in the process in place of those recited in the examples. In each instance it is preferred to use a cellulose ether that is low in water-soluble inorganic compounds. The acetal-type reaction between the water-soluble cellulose ether and the glyoxal, pyruvic aldehyde, or other equivalent aldehyde preferably is conducted in the absence of a catalyst.

There may be substituted in the process—for the water-soluble cellulose ethers—the ethers of other carbohydrates, such as water-soluble hydroxyalkyl starches, although the resultant products are distinctly inferior to those made from cellulose ethers, with respect to water- and oil-impermeability, flexibility and strength.

Thus, a water-soluble hydroxypropyl starch was produced by reacting at 98°–100° C. for 12 hours in an autoclave a mixture of 100 grams tapioca starch, 3 grams of dimethyl dibenzyl ammonium hydroxide, 10 cc. of water and 1500 cc. of propylene oxide. The resultant product was extracted with methanol and dried.

In 100 grams of a 7% aqueous solution of this hydroxypropyl starch, 2.8 grams of glyoxal (containing 18% of water) and 100 cc. of water were dissolved. Dried films prepared from the resultant product were considerably less flexible, and lower in strength, than those made from the corresponding glyoxal derivatives of water-soluble hydroxyalkyl celluloses.

At least one polyhydric alcohol, such as glycerol, ethylene and diethylene glycols and propylene glycol, may be added to the aqueous solution of the cellulose ether to be reacted with the glyoxal or equivalent aldehyde. The resultant product apparently is formed by the concurrent condensation—probably a form of conjoint acetalization—of the water-soluble cellulose ether and the polyhydric alcohol, with the aforesaid aldehyde. The product yields films and filaments which, when dried, are very flexible, extensible and elastic, and have good fatigue values in both flexing and stretching tests.

Thus, 100 cc. of a dialyzed aqueous solution of a water-soluble hydroxyethyl cellulose of the type recited in Example 2, and containing 4.85 grams of solids; 4.85 grams of glycerol; and 3.8 grams of a 51% aqueous solution of glyoxal; were intimately mixed and allowed to set overnight. A film made by drying the resultant solution at 105° C. was water-insoluble, very flexible, extensible, and elastic, and relatively crease-proof. Thin films thus prepared are highly resistant to both mineral and vegetable oils; to common organic solvents; to vaporous mixtures of ethylene dichloride, carbon tetrachloride and para-dichlorobenzene; and to liquid mixtures of ethylene dichloride and carbon tetrachloride. A limited increase in the amount of glyoxal employed in the foregoing example tends to decrease the flexibility and extensibility of the film produced.

The substitution of ethylene glycol for glycerol, in an example otherwise like the last-named example, yielded a clear product having mechanical properties approaching but inferior to those of the product formed when glycerol was used.

Pyruvic aldehyde and other aldehydes of the group hereindescribed may be substituted for glyoxal.

Under conditions generally similar to those employed in the last-named example, a water-soluble partially methylated cellulose such as described in Example 1 produced a dried clear water-insoluble film that was very flexible, extensible, and elastic.

The term "water-soluble cellulose ether" and similar expressions appearing in the claims are intended to include those water-soluble partially alkylated and aralkylated celluloses produced, respectively, by treating a suitable cellulosic material with an alkylating agent such as dimethyl sulfate, or with an aralkylating agent such as benzyl chloride; and those water-soluble hydroxyalkyl celluloses produced by treating such a cellulosic material with an hydroxyalkylating agent such as ethylene oxide.

The invention is susceptible of modification within the scope of the appended claims.

I claim:

1. A coating, impregnating and adhesive composition adapted upon drying to form a product that is insoluble in water, in acetone and in the lower monohydric aliphatic alcohols, said composition essentially comprising a water-soluble cellulose ether and a water-soluble aldehyde having the structure designated by the formula,

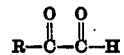

wherein R represents a radical selected from the group consisting of hydrogen and the alkyl radicals.

2. A coating, impregnating and adhesive composition adapted upon drying to form a product that is insoluble in water, in acetone and in the lower monohydric aliphatic alcohols, said composition comprising a water-soluble cellulose ether and glyoxal.

3. A coating, impregnating and adhesive composition adapted upon drying to form a product that is insoluble in water, in acetone and in the lower monohydric aliphatic alcohols, said composition comprising a water-soluble cellulose ether and pyruvic aldehyde.

4. A new composition of matter adapted upon drying to form a product that is insoluble in water, in acetone and in the lower monohydric aliphatic alcohols, said composition essentially comprising a water-soluble cellulose ether, a water-soluble aldehyde having the structure designated by the formula,

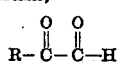

wherein R represents a radical selected from the group consisting of hydrogen and the alkyl radicals, and a water-soluble polyhydric alcohol.

5. A water-insoluble, oil-resistant product formed by the conjoint acetalization of a water-soluble cellulose ether and a water-soluble polyhydric alcohol with glyoxal, said product forming films which when dry are highly flexible, elastic, and resistant to mineral and vegetable oils.

6. A coating, impregnating and adhesive composition adapted upon drying to form a product that is insoluble in water, in acetone and in the lower monohydric aliphatic alcohols, said composition comprising a water-soluble cellulose ether, a water-soluble polyhydric alcohol and glyoxal.

7. A coating, impregnating and adhesive composition adapted upon drying to form a product that is insoluble in water, in acetone and in the lower monohydric aliphatic alcohols, said composition essentially comprising a water-soluble cellulose ether, glyoxal and glycerol.

8. A composition of matter, comprising the product of the reaction between a water-soluble ether derivative of a higher polyose and a water-soluble aldehyde having the structure designated by the formula,

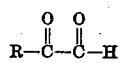

wherein R represents a radical selected from the group consisting of hydrogen and the alkyl radicals; said product being substantially insoluble in water, acetone, and the lower monohydric aliphatic alcohols.

9. As new compositions of matter, acetal-like derivatives of water-soluble cellulose ethers, said derivatives being produced by reacting such an ether with an aldehyde having the structure designated by the formula,

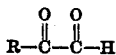

wherein R represents a radical selected from the group consisting of hydrogen and the alkyl radicals, and removing water from the reaction product; said derivatives being insoluble in water, in acetone, and in the lower monohydric aliphatic alcohols.

10. A glyoxal derivative of a water-soluble cellulose ether, said derivative being insoluble in water, in acetone, and in the lower monohydric aliphatic alcohols.

11. A glyoxal derivative of a water-soluble hydroxyalkyl cellulose ether, said derivative being insoluble in water, in acetone, and in the lower monohydric aliphatic alcohols.

12. As new compositions of matter, acetal-like derivatives of water-soluble cellulose ethers, said derivatives being produced by reacting such an ether with glyoxal and removing water from the resultant product, and being insoluble in water and in the common organic solvents.

13. A pyruvic aldehyde derivative of a water-soluble cellulose ether, said derivative being substantially insoluble in water, in acetone, and in the lower monohydric aliphatic alcohols.

14. The water-insoluble, oil-resistant flexible product formed by reacting a mixture of a water-soluble polyhydric alcohol and a water-soluble cellulose ether with an aldehyde having the structure designated by the formula,

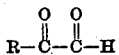

wherein R represents a radical selected from the group consisting of hydrogen and the alkyl radicals.

15. A water-insoluble, oil-resistant product formed by condensing a mixture of glycerol and a water-soluble cellulose ether with glyoxal.

16. As new compositions of matter, acetal-like derivatives of water-soluble hydroxyalkyl cellulose ethers, said derivatives being produced by reacting such an ether with an aldehyde having the structure designated by the formula,

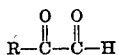

wherein R represents a radical selected from the group consisting of hydrogen and the alkyl radicals, and removing water from the reaction products; said derivatives being insoluble in water, in acetone, and in the lower monohydric aliphatic alcohols.

17. As new compositions of matter, acetal-like derivatives of water-soluble partially alkylated celluloses, said derivatives being produced by reacting such an alkylated cellulose with an aldehyde having the structure designated by the formula,

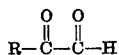

wherein R represents a radical selected from the group consisting of hydrogen and alkyl radicals, and removing water from the reaction products; said derivatives being insoluble in water, in acetone, and in the lower monohydric aliphatic alcohols.

18. Process for converting the water-soluble ether derivative of a carbohydrate to water-insoluble form, which comprises reacting an aqueous solution of such ether derivative with a water-soluble aldehyde having the structure designated by the formula,

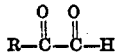

wherein R represents a radical selected from the group consisting of hydrogen and the alkyl radicals and converting the resultant reaction product to a form insoluble in cold water and in common organic solvents by removing water from the reaction mixture.

19. Process for converting the water-soluble ether derivative of a higher polyose to water-insoluble form, which comprises reacting a solution of said ether derivative with a water-soluble aldehyde having the structure designated by the formula,

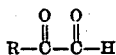

wherein R represents a radical selected from the group consisting of hydrogen and the alkyl radicals converting the residual product to a selected shape, and rendering such product insoluble in water and in common organic solvents by removing water from the reaction mixture.

20. Process for producing a water-insoluble derivative of a water-soluble cellulose ether, which comprises reacting such an ether with an aldehyde having the structure designated by the formula,

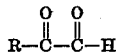

wherein R represents a radical selected from the group consisting of hydrogen and the alkyl radicals, converting the resultant reaction mixture to a selected shape, and recovering the water-insoluble cellulose ether derivative produced by removing water from such reaction mixture.

21. Process for producing a water-insoluble acetal-like derivative of a water-soluble cellulose ether, which comprises reacting such an ether with glyoxal and recovering the residual water-insoluble cellulose ether derivative by removing water from the reaction mixture thus produced.

22. Process for producing a water-insoluble, oil-resistant flexible cellulose ether derivative, which comprises reacting a mixture of a water-soluble polyhydric alcohol and a water-soluble cellulose ether with an aldehyde having the structure designated by the formula,

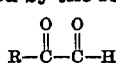

wherein R represents a radical selected from the group consisting of hydrogen and the alkyl radicals, converting the resultant reaction mixture to a selected shape, and recovering the resultant water-insoluble oil-resistant flexible product by removing the elements of water from such reaction mixture.

23. Process as defined in claim 10 wherein the said polyhydric alcohol is glycerol.

AUBREY E. BRODERICK.

CERTIFICATE OF CORRECTION.

Patent No. 2,329,741.  September 21, 1943.

AUBREY E. BRODERICK.

It is hereby certified that error appears in the printed specification of the above numbered patent requiring correction as follows: Page 4, second column, line 25, claim 19, before "converting" insert a comma; line 65, claim 23, for the claim reference numeral "10" read --22--; and that the said Letters Patent should be read with this correction therein that the same may conform to the record of the case in the Patent Office.

Signed and sealed this 9th day of November, A. D. 1943.

(Seal)

Henry Van Arsdale,
Acting Commissioner of Patents.